United States Patent [19]
Schick

[11] 3,842,536
[45] *Oct. 22, 1974

[54] METHOD OF PROTECTING VEGETATION
[75] Inventor: John W. Schick, Cherry Hill, N.J.
[73] Assignee: Mobil Oil Corporation, New York, N.Y.
[ * ] Notice: The portion of the term of this patent subsequent to Apr. 10, 1990, has been disclaimed.
[22] Filed: Oct. 30, 1970
[21] Appl. No.: 85,527

Related U.S. Application Data

[63] Continuation-in-part of Ser. No. 11,315, Feb. 13, 1970, , which is a continuation-in-part of Ser. Nos. 762,156, Sept. 24, 1968, abandoned, and Ser. No. 607,907, Jan. 9, 1967, , which is a continuation-in-part of Ser. No. 471,720, July 13, 1965, abandoned, which is a continuation-in-part of Ser. No. 401,665, Oct. 5, 1964, abandoned.

[52] U.S. Cl............................ 47/2, 44/17, 126/59.5
[51] Int. Cl. ..... A01g 13/00, A01g 13/06, C10l 5/02
[58] Field of Search ............... 44/17; 126/59.5; 47/2

[56] References Cited
UNITED STATES PATENTS

| 3,402,031 | 9/1968 | Schick et al. | 44/17 |
| 3,402,032 | 9/1968 | Schick | 44/17 |
| 3,402,033 | 9/1968 | Starr | 44/17 |

OTHER PUBLICATIONS

Farmers' Bulletin – Frost and the Prevention of Frost Damage – Young – Dept. of Commerce, Wash., D.C., 1947 – Title Page and pp. 22 & 23.

*Primary Examiner*—C. Dees
*Attorney, Agent, or Firm*—A. L. Gaboriault

[57] ABSTRACT

A method is provided of protecting trees in orchards and other vegetation, including blossoms, fruits, limbs and stems thereof from cold and frost for relatively short critical periods of time usually extending from about three to about five hours between about midnight and dawn, which comprises (1) igniting a series of relatively small closely spaced, high-intensity radiation combustible heating units which glow and are substantially flameless, whereby the units may be placed in close proximity or immediately adjacent to said trees and vegetation sufficient to raise the temperature thereof without destructive overheating of the same, in which the units comprise an easily ignitable and quick heat-release first combustible portion so directed in use that the heat emissions therefrom will directly affect said vegetation such as to rapidly raise the temperature thereof to above the danger point, said first portion being capable of continuing to burn for a substantial initial part of said critical period; (2) continuing to supply radiant heat by said units for the remainder of said critical period by means of a second combustible portion comprising closely spaced solids having an ignition temperature above about 2000°F. which provide substantial quantities of radiant heat, and which are arranged immediately adjacent said first combustible portion and are ignited thereby; and (3) continuing to furnish the said heat by said glowing radiant-heat producing solid without the aid of the first combustible portion following a substantial initial burning period, thereby to collectively produce the desired temperature of said vegetation continuously throughout the duration of the entire critical period. The invention also encompasses the above-described combustible heating units.

25 Claims, 1 Drawing Figure

METHOD OF PROTECTING VEGETATION

Figure 1:
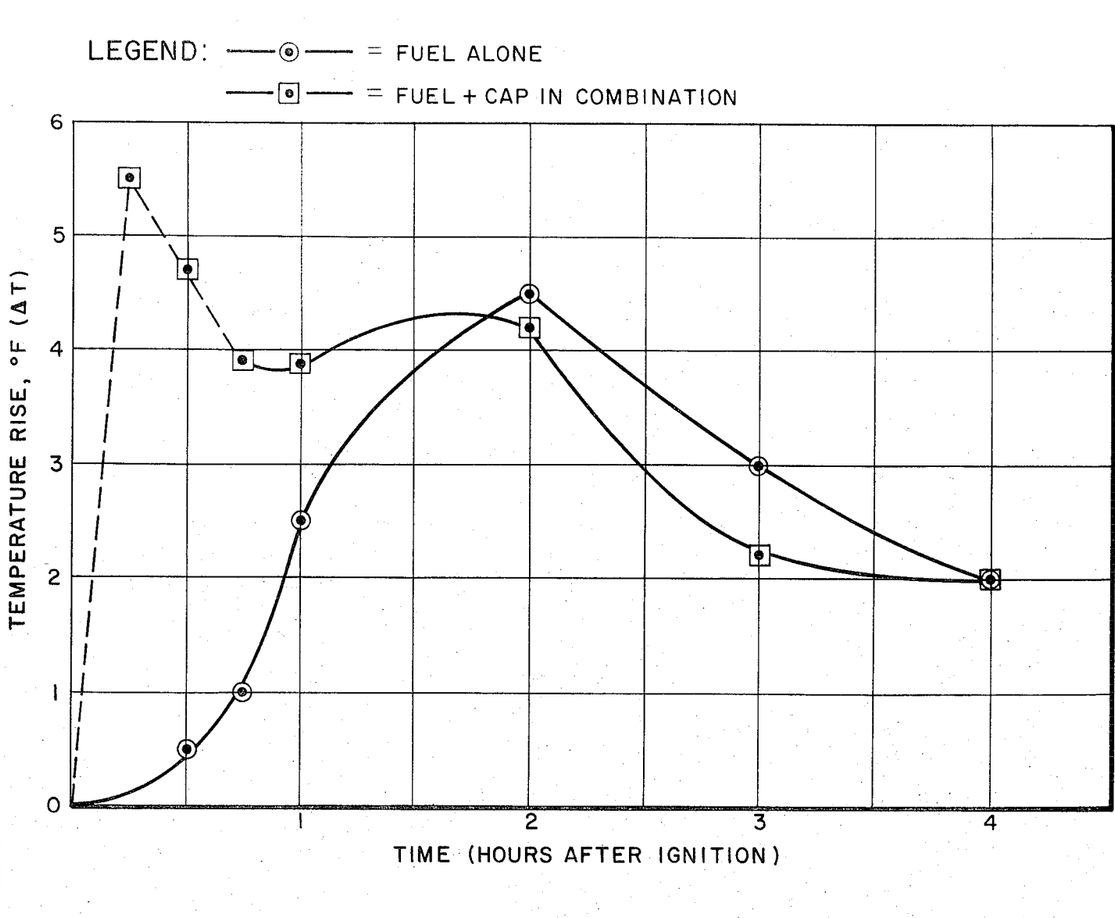

This application is a continuation-in-part of my copending application Ser. No. 11,315, filed Feb. 13, 1970, which in turn is a continuation-in-part both of Ser. No. 762,156, filed Sept. 24, 1968 (now abandoned), and Ser. No. 607,907, filed Jan. 9, 1967, which latter application in turn is a continuation-in-part of Ser. No. 471,720, filed July 13, 1965 (now abandoned), which in turn is a continuation-in-part of Ser. No. 401,665, filed Oct. 5, 1964 (now abandoned).

The invention relates to a novel method of protecting orchards or other vegetation with a novel article of manufacture, more particularly, an artificial fuel composition comprising two principal portions which can be combusted with the absence of substantial smoke and flame, which gives off high percentages of radiant heat at high temperatures and which has outstanding practical utility not heretofore achieved when employed for purposes of orchard heating, or heating various forms of outdoor vegetation to protect the same from cold or frost conditions.

The ability to produce a substantially smokeless and flameless fuel composition would be of significant value, particularly with respect to the problem encountered in combatting low-temperature and frost conditions seasonally encountered in orchards and other outdoor vegetation and crop areas, which cause destruction or heavy damage to fruit, branches, limbs, stems, and, in many instances, to vines and trees themselves. To offset these injurious effects of periodic low-temperature climatic conditions, it is essential that there be provided a source of heat and means for carrying such heat to the vines, trees and other vegetation. For this purpose, heat has theretofore been supplied by various means, ranging from conventional gas and fuel-oil burning frostpot and return-stack heaters to smudging and the burning of scrap rubber, and in which heat is carried to the vegetation by convection currents, or in more sophisticated installations, by wind machines designed to induce such currents. In this respect, however, the use of such devices has resulted in the accompanying dissipation of large quantities of smoke, causing the deposition of soot or smudge upon the fruit or vegetation. In addition, the presence of an open flame in close proximity to the fruit, vines, trees or other vegetation may also result in their damage or in their destruction. Also, prior to the present invention, the burning of artificial solid carbonaceous fuels in the form of small lumps or briquettes in specially designed heaters, has been resorted to; however, in these instances, a smokeless type of fuel briquette is not available. Furthermore, apart from the undesirable deposition of soot resulting from the burning of the briquette the presence of an open flame is still another factor which heretofore rendered the use of carbonaceous briquettes, as a source of heat, unattractive for the aforementioned purposes.

Two factors are taken into consideration when a material is used to treat vegetation, the convective heat supplied and the radiant heat supplied. Of the two, the more important is the radiant heat portion because there is little loss of heat energy when it is transmitted through the air. A strong wind or a small inversion will largely dissipate the thermal effectiveness of heat supplied by convection.

Temperature inversions can cause growers extreme concern. They are caused by the sun warming the ground and the trees during the day. They, in turn, warm the air that comes in contact with them. This war air rises, which raises the temperature of the air over the orchards, but the warmest air is still at ground level. During a radiant cooling night, the ground and the vegetation are cooled and cool the air close to them. At higher levels the air starts to become very gradually colder again as it goes up with altitude. The level at which the reversal from rising temperatures to falling temperatures takes place is the inversion level.

A strong inversion is created when the overhead air is considerably warmer than the air in the orchard. Since warm air from a heat source rises only a relatively short distance before it encounters air of equal temperature which stops its rise, the phenomenon is known as a "low ceiling".

A "weak inversion" is produced when the overhead air is only a few degrees warmer than the air in the orchard. This often occurs at high levels. The heated air has to rise much higher before reaching warm air above. When ordinary pot heaters are employed, much of the convection heat is lost and orchard heating is difficult. A heater which gives off a large degree of radiant heat is necessary to effectively combat the crop-damaging potential of a weak inversion. The fuel compositions of the instant invention have been found to provide the required protection, either alone or combined with conventional heaters and/or wind machines.

The conventional stack heaters, e.g., return stack heaters, jumbo cone heaters, lazy flame heaters and open pots, produce 74–90% of their heat as convection heat in the form of hot gases or air warmed by contact with the hot metal of the stack. If these heaters were used to heat an orchard during the day when the ground temperatures are warmer than those in the air above the orchard, this convection heat would be completely lost since it would continue to rise constantly up into the atmosphere until it arrived at a point of complete dissipation. A temperature inversion is required to hold the convection heat down to a level where it can be effectively used. Thus, conventional stack heaters are of limited utility for crop protection.

Open pot heaters are the simplest and least expensive form of oil heaters. They are also the least efficient. Due to the considerable smoke which emanates from open pots, they have been outlawed in most of California. There is a low degree of radiant heat produced by open pots.

Lazy flame heaters are also relatively simple in construction. A cylindrical galvanized metal stack, usually 18 inches or 24 inches in length, is placed upon a round or square galvanized metal bowl having a 9 gallon capacity. This configuration is designed to cause most of the combustion to take place at or above the top of the stack. Air intakes are provided, ordinarily in the form of downdraft tubes or an internal chimney extending from the base of the stack down into the bowl, in order to distribute primary air. This distribution is supposed to make starting easier and to force the complete burning of oil down to the bottom of the bowl. While having greater efficiency than the open pots discussed supra, they also smoke and soot up. Considerable cleaning is required to remove this soot.

A jumbo or large cone heater is similar to the lazy flame heater and differs therefrom only in the stack. The stack width increases greatly near its base, then tapering throughout its entire height. Tapering is pronounced just above the base with the chimney graduating to a less pronounced taper. Combustion takes place mainly in the large chimney chamber near and just above the stack base, whereas in lazy flame heaters, combustion occurs above the stack. As with the lazy flame heaters, there is a low percentage of radiant heat produced.

Return-stack heaters also give off slight percentages of radiant heat. These heaters have both an upper and a lower stack. The lower stack is louvered and combustion takes place largely therein. A return pipe is fitted into the upper stack to permit some of the combustion product to travel back into the bowl in order to help vaporize the fuel.

Pipeline systems have also been used for protecting vegetation. One relatively new example is the Hudd system consisting of a central storage tank for a light diesel fuel, a pumping system and micronic filters which are connected to buried plastic pipe headers running along the same side of the orchards in both directions. Laterals of flexible pipe are run down the headers with branches to special burners which have the shape of a question mark over the pan. Oil drips down in the pan and is ignited.

This system, however, has a number of difficulties. The burners can be clogged even with very fine impurities in the oil or dirt in the lines. The burners tend to coke up quickly. Little radiant heat is produced. The burner pan lends itself to a quick rusting and water in the burner pan may cause ignition problems. The pipeline is subject to damage from rodents or mechanized equipment with resultant large spillage.

Radiant heat production by the heaters is an extremely important consideration. This portion of heat produced is transmitted directly to the ground or vegetation and is independent of wind and inversion conditions. One authority has indicated that with 12-foot high and 12-foot diameter trees, approximately one-third of the radiant heat is absorbed by the ground. One-third is absorbed by the trees and the remainder is lost to the air. A heater with 18% radiant energy output, losing one-third to the sky and operating at 80% thermal efficiency will effectively use only 9% of its heat energy as radiant heat in heating the grove. With a lazy flame heater, this may be less than 3%.

The following chart gives the average performance characteristics of heaters used for cold protection.

| Type of Heater | Input 1000 BTU per Hour | % Radiant Heat |
| --- | --- | --- |
| Gas Heaters (tile or metal mantle type) | 50–100 | 45–55 |
| Coke Heaters | 50–100 | 30–35 |
| Jumbo Cone | 75–150 | 18–26 |
| Return Stack | 75–150 | 15–22 |
| Lazy Flame or Short Stack | 75–150 | 10–15 |
| Barrels | highly variable | 5–15 (estimate) |
| Open Pots | highly variable | 5–15 |
| Solid Fuels (wax) | 25 | 2–5 |
| Open Gas Jets | 25–75 | 0–5 |

Solid wax candles employing a low-grade wax with some sort of wick have been used for protecting vegetation. There is a very low production of radiant heat; see the table above. While producing good heat under trees, they also burn with a 1½ foot to 3-foot flame which can cause considerable tree damage.

The aforementioned ability to employ a substantially smokeless fuel composition, for example in the form of briquette which is capable of burning without the presence of any substantial flame, would, therefore, be highly desirable. The use of equipment such as the aforementioned frost-pots, return-stack heaters, wind-machines, etc. would be completely eliminated, with its attendant saving in cost. In addition, the ability of the fuel composition to burn without the presence of a flame would permit placing it in close proximity or adjacent to the trees, vines or other forms of vegetation, and would thus avoid expensive waste of the heat values, as is presently encountered when the heat source must be placed at a considerable distance from the desired point of application.

Previously, sold fuel compositions, in a wide variety of formulations and in varying shapes and configurations, have been enclosed in both combustible and non-combustible containers or wrappers. When the solid fuel is enclosed in a non-combustible container, e.g., a metallic enclosure, combustion and ultimate consumption of the fuel results in leaving a metal shell containing the residue of combustion (e.g., an ash-like or solid residue) with the attendant problem of disposal. This problem is of particular importance where solid fuel compositions are combusted outdoors for providing heat for combating frost and freeze damage to crops and other forms of outdoor vegetation. In such instances, it is quite common to combust several hundred solid fuel briquettes which, if they were to burn in an unconfined state (i.e., without a suitable container for confining the burning fuel) would result in a disastrous spread of fire and damage, for example, to orchards, fields, or forests. On the other hand, if non-combustible containers are employed for confining the spread of fire, the problem of time-consuming and expensive ultimate disposal of these containers, must be considered. Furthermore, if a combustible container is employed, combustion and ultimate collapse of the container results in the possibility of fire-spreading hazards.

Prior to the present invention, solid fuel compositions in the form of charcoal briquettes or lumps for heating purposes, have generally been fabricated from mixtures containing small amounts of charcoal and minor amounts present in filler materials, such as sawdust, wood-shavings, cardboard or excelsior, and various forms of binding agents. Such mixtures are usually compressed in an relatively high pressure into the briquette to about lump form, and are subsequently coated by immersion or spraying with a waterproofing agent, such as varnish, paraffin, resin or plastic material. Various formulary modifications have also been suggested, including improvements relating to the filler, binder and waterproofing components. In all such formulations, it is found, however that certain highly undesirable disadvantages are inevitably present. Of particular significance, is that the briquette or lump-form composition cannot be burned without the release of smoke, or the presence of an open flame, as hereinbefore described. Apart from these disadvantages, the ability of the briquette to release its heat at a controlled rate, is highly desirable from both a practical and economic standpoint. In this respect, the conventional form of briquette is also deficient.

It should also be apparent in view of the great difficulty in predicting a given frost condition well in advance, that a fuel affording a quick heat-release would be highly desired, especially if such initial quick emission of heat were such as to provide the desired temperature rise within a few minutes and if the fuel could otherwise maintain the temperature of the vegetation above the danger point throughout the entire critical period.

It is therefore an object of the present invention to provide an improved solid fuel composition which is capable of burning without the presence of substantial smoke or flame, and which is capable of quick heat-release of a significant quantity.

Another object of the invention is to provide an improved artificial solid carbonaceous fuel composition, preferably in the form of a briquette (i.e., lump or pillow-shaped articles and brick-shaped articles as well) which is capable of burning without the presence of substantial smoke or flame.

It is another object of the present invention to provide an improved method for protecting vegetation from low-temperature and frost conditions by using a quick heat-release solid fuel composition capable of burning without the presence of substantial smoke or flame.

It is yet another object of the present invention to provide an improved method for protecting vegetation from low-temperature and frost conditions by using a quick heat-release solid fuel composition capable of burning without the presence of substantial smoke or flame.

It is yet another object of the present invention to provide an improved method for protecting vegetation from low-temperature and frost conditions by using a quick heat-release solid fuel composition which gives off high percentages of radiant heat at high temperatures.

Other objects and advantages inherent in the invention will become apparent from the following more detailed description.

In order to attain these and other objects, the present invention provides, in general, an article of manufacture for protecting trees in orchards and other vegetation, including blossoms, fruits, limbs and stems thereof from cold and frost for relatively short critical periods of time usually extending from about three to about five hours between about midnight and dawn, which comprises a relatively small high-intensity radiation combustible heating unit which glows and is substantially flameless, whereby the unit may be placed immediately adjacent to said tree and vegetation sufficient to raise the temperature thereof without destructive overheating of the same, in which the unit comprises: (1) an easily-ignitable and quick heat-release first combustible portion so directed in use that the heat emissions therefrom will directly affect said vegetation such as to rapidly raise the temperature thereof to above the danger point, said first portion being capable of continuing to burn for a substantial initial part of said critical period; and (2) a second combustible portion for supplying radiant heat for the remainder of said critical period comprising closely spaced solids having an ignition temperature above about 2000°F. which provide substantial quantities of radiant heat, and which are arranged immediately adjacent said first combustible portion and are ignited thereby; whereby said first and second portions collectively produce the desired temperatures of said vegetation continuously throughout the duration of the entire critical period.

The aforesaid second combustible portion, in general, consists of a substantially smokeless and flameless fuel composition comprising a major proportion of a primary combustible solid, characterized upon combustion by a relatively slow rate of burning and the ability to radiate heat without the presence of a substantial flame, having an ignition temperature in excess of about 2000°F., a minor proportion of a solid oxidizing agent capable of supporting combustion, and a minor proportion of a secondary combustible solid having an ignition temperature below that of the primary combustible solid, the aforementioned components being combined in such manner and amounts whereby, upon ignition, the oxidizing agent undergoes decomposition to liberate an ozidizing medium, which upon contact with the secondary combustible solid produces an exothermic reaction, providing in turn sufficient heat to effect combustion of the primary combustible solid.

Of particular importance in the fuel compositions of the present invention is the primary combustible solid. The material employed for this purpose is one which is capable of burning without the presence of substantial smoke or flame, and has an ignition temperature in excess of about 2000°F. These materials have a low volatility content of not more than about 12%. Various materials may be employed as the primary combustible solid in these fuel compositions. One such outstanding material is petroleum coke. This refractory carbonaceous material has not, heretofore, been considered as having any significant fuel value, from a practical commercial standpoint because of its characteristic lack of being easily ignitable and its inability to readily support combustion. Thus, petroleum coke which is generally commercially obtained in the form of either a delayed or fluid coke, possesses a low volatility content, usually not more than about 12%, and is ignitable only at temperatures as high as from about 2500°F. to about 2700°F. Delayed coke varying in physical properties from finely divided particles to relatively coarser and larger particles is more volatile and less carbonaceous than fluid coke and is ignitable at a somewhat lower temperature within the aforementioned range than fluid coke. In this respect, it is found that if the petroleum coke or other selected primary combustible solid (having the aforementioned characteristics) can be successfully ignited to a temperature where it can support combustion, it can burn in a state of glow, without emission of substantial smoke or the presence of an open flame, and at a controlled rate, thus making possible the realization of the previously discussed advantages.

The primary combustible solid, as previously indicated, may, therefore, comprise any material which has an ignition temperature in excess of about 2000°F., and a volatile content of not more than about 12%, and may, therefore, include not only petroleum coke, either delayed or fluid coke, but also other materials such as coal coke, coke breeze and coal, preferably of the anthracite type, and various forms of other materials which satisfy the above requirements as to minimum ignition temperature and volatility content.

The particle size of the primary combustible solid is preferably such that at least 90% will pass through a 100 mesh screen, with essentially all particles passing through an 80 mesh screen. The especially preferred particle size of the primary combustible solid is such that at least 95% will pass through a 100 mesh screen, with essentially all particles passing through an 80 mesh screen. It is not preferred that the particle size is such that 85% or less of the particles cannot pass through a 100 mesh screen.

The preferred particle size of the primary combustible solid is designed to insure a five hour burning period for the fuel compositions of the instant invention.

In order to attain the aforementioned relatively high temperatures required for igniting the primary combustible solid of the second portion of the heating unit or package and for subsequent self-burning sustained combustion thereof, the solid fuel compositions as previously indicated are also comprised of a minor proportion of a secondary combustile solid having an ignition temperature below that of the primary combustible solid. In this respect, it is noted that ignition of the secondary combustible solid results in the combustion thereof at sufficiently high temperature which is effective for the subsequent ignition and support of combustion of the primary combustible solid. This secondary combustible solid may, therefore, comprise such materials as charcoal, wood-sawdust, cotton hulls, or other naturally occurring fibrous materials, cellulosic derived materials, and similarly related combustible solids. In a preferred modification, the fuel compositions of the present invention may contain as the secondary combustible solid a mixture of charcoal and sawdust. In this embodiment, the presence of the wood-sawdust component makes possible a combustion mechanism in which the wood-sawdust, being the most easily combustible component present, is most readily ignitable, gives off sufficient heat upon being combusted to ignite the charcoal component, and the latter, upon being ignited and combusted, in turn gives off heat at relatively increased temperature which is sufficient for the purpose of igniting and initiating sustained combustion of the petroleum coke or other selected primary combustible solid.

In order to easily initiate the combustion of the secondary combustible solid in the novel fuel compositions of the present invention, the aforementioned solid oxidizing agent, capable of supporting combustion, is incorporated in minor proportion in the solid fuel composition. The concentration of this oxidizing agent in the solid fuel composition, above the minimum level required to support combustion of the primary combustible solid, can be varied to any desired burning rate. In general, the function of the oxidizing agent in the novel fuel composition is such that upon ignition, the oxidizing agent undergoes decomposition to liberate an oxidizing medium which, upon contact with the secondary combustible solid, as previously indicated, produces an exothermic reaction providing, in turn, sufficient heat to effect combustion of the primary combustible solid. Various types of oxidizing agents may be employed for this purpose, and particularly preferred are the nitrates, chlorates, perchlorates, peroxides, permanganates, chromates and dichromates. It will be apparent, of course, that in a given instance each oxidizing agent can be employed in different amounts in order to obtain a desired burning rate for the fuel composition. In essence, therefore, this ability of being able to effect ultimate combustion of the primary combustible solid in a sustained manner and at a controllable burning rate, makes possible the production of a solid fuel composition which can burn without the presence of substantial smoke or open flame and with all the obvious attendant advantages previously described.

It will be understood, of course, that various other materials may also be present in the novel fuel compositions of the present invention, if so desired, in addition to the basic primary and secondary combustible solids and oxidizing agent. Thus, the solid fuel compositions may also include various materials acting as consolidating agents or binders, such as resinous materials, plastics, paraffins, shellac and combustion-supporting adhesives. Particularly preferred are binders comprising a soluble starch. Furthermore, from a practical standpoint, in instances where the fuel composition is to be employed for outdoor heating purposes, the presence of minor amounts of a waterproofing agent may be desirable. For this purpose, various compatible combustible waterproofing agents may also be incorporated into the fuel composition. These may include such agents as water-soluble, but dispersible resins and polymers such as polyethylene, and relatively non-volatile, viscous, combustible natural or synthetic oils. Particularly preferred are waterproofing agents comprising wax emulsions.

In order for the fuel composition to be an effective and practical orchard heating source, it has been found that from about 80 to about 90% of the available heat values should be emitted within a period of from about 3 or 4 to about 5 hours after ignition. This burning rate can be achieved by maintaining the fuel composition density about 30 pounds per cubic foot, and normally is not greater than about 55 pounds per cubic foot.

In one embodiment the fuel compositions may be comprised, by weight, of the primary combustible solid present in an amount from about 50 to about 90%; the secondary combustible solid present in an amount from about 2 to about 40%; and the oxidizing agent in an amount from about 2 to about 20%. In a preferred form, the primary combustible solid is present, by weight, in an amount from about 65 to about 80%; the secondary combustible solid is present in an amount from about 2 to about 20%; and the oxidizing agent is present in an amount from about 2 about 15%.

As a specific representative example, the fuel compositions may comprise, by weight, from about 50 to about 90%, and, preferably, from about 65 to about 80% petroleum coke; from about 3 to about 20%, and, preferably, from about 5 to about 15% wood-sawdust; from about 4 to about 20%, and, preferably, from about 7 to about 20% charcoal; from about 2 to about 15%, and, preferably, from about 5 to about 10% oxidizing agent. In addition, such preferred fuel compositions may also contain from about 1 to about 10%, and, preferably, from about 3 to about 5%, by weight, of a binder. In instances where a waterproofing agent is to be employed the latter may be present in an amount from about 0.5 to about 8%, and, preferably, from about 1 to about 2%, by weight.

An igniting composition may be applied to at least a portion of the fuel composition. This igniting composition, in general, comprises a major proportion of the aforementioned secondary combustible solid and a minor proportion of the oxidizing agent. More specifically, the igniting composition may be comprised of the same components as are present in the particular fuel composition itself, except for the absence of the primary combustible solid. Ignition of this layer causes a relatively high degree of heat to be transmitted to the basic fuel composition itself, for more rapid and complete ignition of the latter. In its preferred form, this igniting composition may comprise from about 85 to about 95%, by weight, of the secondary combustible solid and from about 5 to about 10%, by weight, of the oxidizing agent, with the remainder of the igniting composition comprising varying amounts of any of the aforementioned additional materials, such as, for example, binder and waterproofing agent.

The preparation of the solid fuel compositions is generally carried out by forming a mixture comprising the primary and secondary combustible solid components; forming an aqueous solution of the oxidizing agent (the waterproofing agent and binder may also be included in this solution); combining the aforementioned mixture and the aqueous solution; and forming from the resulting product a fuel composition of desired shape. In a preferred and more specific method of manufacture, petroleum coke, as the primary combustible solid, and charcoal as the secondary combustible solid, in accordance with the above-described proportional requirements, are crushed or pulverized and thereafter wood-sawdust, as an additional secondary combustible solid, is added. These three components in their required proportions are then mixed in the dry state. A separate mixture comprising an aqueous solution of the oxidizing agent and binder (and also a waterproofing agent, if so desired), is formed in accordance with the aforementioned proportions. The thus-obtained dry and wet mixes are then combined, molded to the desired shape and dried. The solid fuel composition is then ready for use.

In a preferred form, when the solid fuel composition is to be employed in the form of a briquette, the aforementioned dry and wet mixes are combined in the form of a slurry, and this slurry is then subjected to an extrusion operation. In this modification, the slurry is preferably fed into a pug mill and forced through a die of such contour as to obtain a briquette having the desired dimensions. The briquette thus produced is then passed into a heater or other device in which water is removed at temperatures from about 160°F. to about 250°F. In another form, the slurry may be placed in a mold of the desired shape or form and then dried. Also, if so desired, the solid fuel composition may be immersed in or sprayed with a waterproofing agent, if such agent was not originally present as a component of the aforementioned wet mix.

If the presence of the aforementioned igniting composition is desired, a thin layer of this composition is added to at least a portion of the surface of the formed solid fuel composition. When the fuel composition is to be obtained in the form of a briquette, this layer is preferably applied by spraying a separate mixture of the secondary combustible solid (e.g. charcoal) and the oxidizing agent (which can also include a binder and waterproofing agent, if so desired), and simultaneously, spraying the wood-sawdust component (as another secondary combustible solid) through a separate nozzle, to avoid nozzle plugging, over the surface of the solid fuel, or briquette composition, to form the igniting composition layer, in situ. In this instance, also, the waterproofing agent may be applied over the entire surface of the igniting layer and the basic fuel composition itself, is so desired, and if not previously incorporated either in the igniting layer or the basic fuel composition, or both. Furthermore, the entire mixture of the charcoal, and the sawdust, secondary combustible solids, oxidizer, binder and waterproofing agent can be extruded directly onto the surface of the briquette.

The fuel compositions of the instant invention are particularly useful when enclosed by a combustible wrapper and are part of adjacent closely associated fuel sections having interfacing surfaces at least slightly spaced and wherein the interface areas between the sections have relatively lower densities than the remaining areas of the sections, thereby providing radiating surfaces.

Representative examples of facing surfaces presenting a low density interface are blocks placed side-by-side, a mass of fuel composition with a hole therethrough (an angle food cake configuration), briquettes in a container, a cracked fuel composition and fuel composition in a container having divider plates or cores. A preferred configuration for protecting vegetation is two blocks aligned side-by-side and placed about one-half to about 1 inch apart.

The two block configuration in combination with a fibrous pad or plate as the second combustible portion of the heating unit is an especially preferred embodiment. As will be explained in detail hereinafter, this second portion provides an early temperature rise as well as ignition of the blocks, and is important to the formation of a desirable burning curve, i.e., one in which a high temperature is achieved early and is maintained throughout the critical period.

The outstanding feature of the solid smokeless and flameless fuel compositions of the present invention resides in the phenomenon that, unlike the combustion of conventional charcoal briquettes or pellets, the heat realized is in the form of radiant, infra-red, heat emanations. This form of heat is transmitted by radiation directly to the fruit, limbs, trunks or other forms of vegetation, with minimum loss to the atmosphere. In contrast, it will be noted that conventional grove-heating systems, employing other types of fuel, operate, principally, by heating the air and carrying air, so heated, by convection currents to the desired point of application. In the latter instance, much of the gaseous heat tends to escape without being carried to the vegetation. In actual practice, when employed for outdoor heating, the solid fuel composition, preferably in the form of a briquette, being resistant to weather, can be stored on the ground, or, for example, in the crotch of a tree, for use when frost appears to be imminent. When temperature conditions are such as to indicate the use of these compositions, the package may be placed on the ground in the vicinity of the vegetation, or hung from tree limbs, in any convenient manner, and easily ignited by the flame or a torch or other kindling means.

In essence, therefore, the present invention provides a method for protecting vegetation against frost damage by combusting heating unit in open atmosphere, which is positioned substantially below the top of the vegetation to be protected and within the area bounded by terminal points of the vegetation, in which radiant heat emitted at the surface of the solid material is absorbed by elements of the vegetation to provide a degree of protection to all elements thereof, and efficiency of fuel utilization both in excess of that obtainable by convection heating, characteristic of flame combustion, and of combustion occurring within a confined area such as a metallic stove.

It its more specific form of application, this method provides placing the solid carbonaceous material, e.g., in the form of a briquette, at a vertical position substantially below the top of a tree to be protected and at a horizontal position within the area bounded by the ends of limbs, to provide protection to all elements of the tree, as described above. In this respect, it has been found that a briquette comprising approximately, by weight, 69% petroleum coke, 10% wood-sawdust, 10% charcoal, 5% sodium nitrate, 5% starch and 1% wax emulsion, and covered with an igniting composition comprising, approximately, by weight, 44% wood-sawdust, 44% charcoal, 8.8% sodium nitrate, 2.3% starch and 0.9 % wax emulsion, and measuring 6 × 6 × 9, inches is capable of releasing approximately 10,000 BTU per hour. With a depth of 6 inches, a briquette can burn for a period of 4 hours, i.e., at the rate of 1½ inches per hour. The following comparative data, as shown in the accompanying table, will serve to exemplify the improved characteristics of the fuel compositions, in the preferred from of briquettes, for orchard heating, as compared with conventional fuel compositions similarly intended for such purpose.

It will be noted from the following data that the burning rate of the petroleum coke (delayed petroleum coke) plus the oxidizer, as shown in sample 1, was equal to that of briquettes containing 10 percent or 20% by weight of charcoal (samples 2 and 3, respectively) or 10% or 20% wood-sawdust (samples 4 and 5, respectively) as the filler materials. It will also be noted, however, that the use of 20% of a 50–50 charcoal-sawdust mixture employed as a filler (sample 7), almost doubled the burning rate.

It will also be noted from the foregoing data that the burning rate of a petroleum coke based briquette containing 20% charcoal/wood-sawdust filler, and 5% of sodium nitrate, as an oxidizer (sample 7) was compared with that of a similarly compounded briquette, which contained no oxidizer (sample 8). In this respect, it will be noted that the briquette without the oxidizer was ignited with great difficulty, and would not sustain combustion when a lighting torch was removed. The other briquette, on the other hand, burned at a constant rate. The briquette containing 30% wood-sawdust, as a filler, and no oxidizing agent (sample 9) conclusively illustrates the need for an oxidizing agent. Upon ignition, the wood-sawdust in the sample burned completely, leaving a residue of unburned petroleum coke. When 5% of the oxidizer was added (sample 6) the briquette burned completely.

Referring again to the table, it will be noted that a series of petroleum coke based briquettes, containing 20% charcoal/wood-sawdust filler were formulated with varying amounts of oxidizer. As the concentration was decreased from 8 to 5% (samples 20, 10, 19 and 7) the burning rate decreased. Employing 3% of the oxidizer (sample 11) the burning rate was almost negligible, while with no oxidizer being present (sample 12), ignition could not be obtained. Briquettes, having no filler present, can be burned at relatively high rates by employing relatively high concentrations of the oxidizer, as shown by the data of samples 15, 16 and 17. However, at these concentrations it was found that the briquettes burned too vigorously to be useful for the intended application.

Employing 5 percent of the oxidizer, the effect of charcoal/wood-sawdust filler concentration of the briquette burning rate was determined. It will be seen, in this respect, that the burning rate was increased five-fold by increasing the filler concentration from 5 to 20 percent (samples 7, 18, 13, and 14). The same trend Solid Fuel Briquettes For Orchard Heating

| Sample[1] | Base Fuel | Filler Type[2] | Wt% | Oxidizer Wt% $NaNO_3$ | Binder Wt% Starch | Burning Rate gm./hr. | Remarks |
|---|---|---|---|---|---|---|---|
| 1 | Petroleum Coke | None | — | 5 | 5 | 15 | |
| 2 | do. | Charcoal | 10 | 5 | 5 | 14 | |
| 3 | do. | Charcoal | 20 | 5 | 5 | 15 | |
| 4 | do. | Sawdust | 10 | 5 | 5 | 10 | |
| 5 | do. | Sawdust | 20 | 5 | 5 | 16 | |
| 6 | do. | Sawdust | 30 | 5 | 5 | 45 | |
| 7 | do. | Sawdust/Charcoal | 20 | 5 | 5 | 25 | |
| 8 | do. | Sawdust/Charcoal | 20 | 0 | 5 | 0 | Would not ignite |
| 9 | do. | Sawdust | 30 | 0 | 5 | 0 | Sawdust burned-coke did not |
| 10 | do. | Sawdust/Charcoal | 20 | 7 | 5 | 33 | |
| 11 | do. | Sawdust/Charcoal | 20 | 3 | 5 | 4 | |
| 12 | do. | Sawdust/Charcoal | 20 | 1 | 5 | 0 | Would not ignite |
| 13 | do. | Sawdust/Charcoal | 10 | 5 | 5 | 16 | |
| 14 | do. | Sawdust/Charcoal | 5 | 5 | 5 | 6 | |
| 15 | do. | None | 0 | 15 | 5 | 96 | Flared on ignition |
| 16 | do. | None | 0 | 11 | 5 | 96 | Flared on ignition |
| 17 | do. | None | 0 | 8 | 5 | 72 | Flared on ignition |
| 18 | do. | Sawdust/Charcoal | 15 | 5 | 5 | 20 | |
| 19 | do. | Sawdust/Charcoal | 20 | 6 | 5 | 32 | |
| 20 | do. | Sawdust/Charcoal | 20 | 8 | 5 | 53 | |
| 21 | do. | Sawdust/Charcoal | 15 | 6 | 5 | 27 | |
| 22 | do. | Sawdust/Charcoal | 10 | 6 | 5 | 20 | |
| 23 | do. | Sawdust/Charcoal | 20 | 6 | 5 | — | Sprayed wax for waterproofing |
| 24 | do. | Sawdust/Charcoal | 20 | 6 | 5 | — | Oil in water emulsion |
| 25 | do. | Sawdust/Charcoal | 20 | 6 | 5 | 158 | 0.75% wax emulsion |

[1]All samples thru number 22 are 50 gms. in weight. Samples 23, 24 and 25 are 500 gms. in weight.
[2]Sawdust/Charcoal comprises a 50–50 mixture of wood-sawdust and charcoal.

was observed in a series of briquettes containing 6 percent of the oxidizer (samples 19, 21, and 22).

It will also be noted from the foregoing data that several methods of waterproofing the briquettes were investigated. While the spraying of paraffin wax dissolved in hexane (sample 23) or incorporating an oil in water emulsion (sample 24) can produce a briquette which would repel water, the most successful results, however, were obtained in incorporating a wax emulsion with the mix before forming the briquette. It will be noted that as little as about 0.8 percent of this wax emulsion (sample 25) produced a waterproofed briquette.

Economics plays an important part in the type of materials used in frost protection systems. Petroleum coke brick products are extremely useful; for they cost nothing to maintain if they are not used and result in savings to the person employing them on cold nights by way of frost protection for his crops. There is no depreciation and maintenance involved when the petroleum coke bricks are used, as is the case with wind machines and return-stack heaters.

The petroleum coke brick products are more efficient than conventional systems because a large number of small fires is more efficient that a small number of large fires. Less heat is lost to the atmoshpere by the "chimmey" effect. In the average situation, 100 petroleum coke brick locations are used per acre compared with 35 return-stack heaters.

The petroleum coke brick products are more reliable than wind machines since they do not require an inversion layer to be effective.

The following chart gives an economic comparison among wind machines, return-stack heaters and the petroleum coke brick products of the instant invention for zero, one, and two nights of frost protection per growing season.

| Zero Nights | Wind Machine | Return-Stack Heaters | Petroleum Coke Brick Products |
| --- | --- | --- | --- |
| Equipment and Maintenance | $144.00 | $ 84.00 | — |
| Fuel | — | — | — |
| Total Cost per Acre | $144.00 | $ 84.00 | — |
| One Night | Wind Machine | Return-Stack Heaters | Petroleum Coke Brick Products |
| Equipment and Maintenance | $144.00 | $ 84.00 | — |
| Fuel | $ 1.00 | $ 24.00 | $ 50.00 |
| Total Cost per Acre | $145.00 | $108.00 | $ 50.00 |
| Two Nights | Wind Machine | Return-Stack Heaters | Petroleum Coke Brick Products |
| Equipment and Maintenance | $144.00 | $ 84.00 | — |
| Fuel | $ 2.00 | $ 48.00 | $100.00 |
| Total Cost per Acre | $146.00 | $132.00 | $100.00 |

As seen from a review of the accompanying drawing, it has been found that periods of the order of about one-half hour of burning of the fuel composition alone (i.e., the second combustible portion of the heating unit of this invention) must normally occur before any appreciable temperature rise in the area of vegetation, for example, in citrus of deciduous tree groves, can be detected. This characteristic of the aforementioned solid fuel composition makes it necessary for the grower to make a determination appreciably in advance of a deleterious temperature drop, to ignite the fuel for ultimate protection. During that time, weather conditions can improve to the extent that no additional protection, as a result of fuel combustion, is required. Furthermore, once the solid fuel composition has been ignited, it is found that there is no known way of extinguishing it for reuse at a subsequent time. It will therefore be apparent that modification of the aforementioned fuel composition to the extent that the release of instantaneous heat, rather than an ultimate build-up thereof, is highly desirable.

Thus, in accordance with the present invention, an article of manufacture is provided which comprises a substantially smokeless and flameless solid fuel which has at least a portion of its surface in contact with a combustible fibrous composition (herein referred to as the "first combustible portion" of the heating unit of this invention), which upon ignition begins to emit heat and continues to do so until the solid fuel, itself, has been ignited and emits heat. In this respect, it is found that a combustible fibrous composition or cap, when placed on at least one of the surfaces of the solid fuel (which may be employed in the form of a "briquette") and ignited, results in the cap burning with a low flame, emitting instant convective heat. This fibrous cap is designed for the specific purpose of burning for a sufficient period of time to quickly ignite the bulk of the solid fuel, itself, and thereby permitting the latter to assume its primary heating role after the cap has been consumed. Thus, the ability to attain the full heat potential of the solid fuel composition within a relatively short period of time after ignition, avoids the necessity of making a possible erroneous anticipatory determination that additional heat will be required for protection of vegetation against frost or freezing conditions; and also avoids the problem of fuel waste in the event that weather conditions ameliorate during the intervening warm-up period of initial ignition and subsequent sustained combustion of the solid fuel composition, itself.

As an alternative form of the present invention, as more fully hereinafter described, a combustible container for solid fuel compositions is provided in which the container is coated with a material capable of leaving a residue after the container is combusted, and having sufficient strength to be self-supporting and for withstanding the weight of the solid fuel without collapsing. More specifically, after the solid fuel has been ignited and after the structural material of the container has been ignited and combusted, the coating material leaves a hard ash-like residue in the original shape or configuration of the container, which has sufficient strength to be self-supporting and also for withstanding the weight of the combusting solid fuel. After the fuel has been combusted in this manner, the hard residue container serves to confine the combustion without the damage of fire-spreading, and after being left standing upon completion of fuel combustion, is washed away by the next recurring rainfall leaving no rubbish or disposal problem.

The structural container may be comprised of any combustible material and may include such structural materials as paper, cardboard, corrugated board, pressboard, wood, wood-pulp, cotton cloth and other forms of cellulosic materials. Modifications of such materials may also be employed including such structural materials as matted wood-fibers, impregnated materials of the aforementioned types, laminates thereof, combustible structural plastics and the like.

The material employed for coating the surface of the container structure is a material, which is sufficiently thermosetting upon exposure to heat to result in producing the aforementioned hard ash-like residue in the form of a self-supporting container, which supports the weight of the solid fuel while the latter is undergoing combustion. This coating material may, therefore, comprise any water-soluble, water-dispersible or solvent-soluble material which is capable of exhibiting the aforementioned properties and includes such materials as the epoxy resins; acrylic resins such as, polymethylacrylate and polymethylmethacrylate; phenol-aldehyde resins such as, phenol-formaldehyde and resorcinol-formaldehyde; urea-aldehyde resins such as, urea-formaldehyde and melamine-formaldehyde; metal silicates such as sodium silicates, e.g., sodium silicate (tetra) (water-glass); or sodium, calcium, aluminum or barium silicates; metal phosphates such as, sodium, barium, aluminum and calcium metaphosphate, pyrophosphate or orthophosphate; and metal borates such as, sodium metaborate, potassium metaborate or potassium pentaborate; or combinations thereof.

Any type or form of solid fuel composition may be combusted utilizing the novel improved containers of the present invention, and may comprise any shape or configuration including lumps, nuggets, bricks (all coming within the generic term "briquette" as used herein) of a wide variety of formulations including such combustible materials as wood, wood-sawdust, peat, charcoal, coal, paper, cloth, coke and the like, or combination of such In any of these embodiments, it is very desirable that non-horizontal interfaces be provided during combustion, either by providing adjacent blocks or briquettes or a mass of fuel capable of forming cracks when heated or provided with combustible dividers of a low density fast burning material.

The combustible fibrous composition, as previously described, is placed in contact with at least a portion of the surface of the solid fuel. This fibrous composition may comprise any fibrous material such as, for example, fiberboard, hardboard, paperboard, paperpulp, fibrous cellulosic materials, fibrous plastic materials and structurally related materials, which are covered or impregnated with an ignitable material whose heat of combustion is sufficient to ignite the above-described solid fuel composition, itself. These ignitable materials may therefore include paraffin waxes, polyterpenes, oils and other ignitable materials which will ignite before the solid fuel composition, itself, ignites. In a preferred modification, the fibrous combustible composition may be employed in the form of a cap comprising a piece of wax-impregnated fiberboard or paperboard positioned on the upper surface of a briquette comprised of the aforementioned solid fuel composition. When ignited, this cap will burn with a low, noticeable flame and emits instant convective heat. The burning time and the quantity of heat released are dependent upon the dimensions of this fiber cap and its density as well as the wax content. The fiber cap is designed specifically to burn sufficiently long, as previously indicated, to ignite the bulk of the solid feul briquette, permitting it to assume its heating role after the cap has been consumed. Thus, this fibrous composition makes possible for the grower to have a relatively high degree of latitude for initiating frost or freeze protection in the shortest time. It should be noted that the aforementioned fibrous composition may simply be placed in contact with a portion of the surface of the solid fuel, itself, and then covered with an outer combustible material or wrapper, such as plastics, paper, and the like. It is also within the scope of the invention to merely cement or attach the fibrous composition to a surface of the solid fuel composition, if so desired, without the necessity for using any external wrapping material.

Outstanding results have been achieved with a fuel composition comprising a combustible cellulosic container of woodpulp, cardboard, or corrugated board, coated with sodium silicate and having disposed therein a solid fuel comprising, by weight, about 70% petroleum coke, 9% wood-sawdust, 5% charcoal, 12% sodium nitrate and 4 percent starch.

The aforementioned coating material for producing the hard ash-like residue is applied to the surface of the structural container material in any of several ways, for example, by painting, spraying, dipping or rolling. This coating is applied in any desired thickness or amounts depending upon the weight or other physical characteristics of the solid fuel to be confined during combustion. Coatings comprising, in general, from about 5 to about 20% are preferred in most instances, although they may be applied to the container surface in any desired or practical amount. Obviously, the thicker the coating, the stronger and more durable will be the resulting shell residue.

The following examples and corresponding data will serve to illustrate the novel fuel compositions of the present invention and the benefits derived by employing, in combination therewith, the aforementioned combustible fibrous composition as an essential component thereof.

Examples 1–10

A specimen of Celotex fiberboard measuring 7½ × 4¼ × 29/64 inches, impregnated with 90 grams of paraffin wax and covering the top of two 2-lb. fuel briquettes (having the composition shown in Table I) was packaged and compared with two similar briquettes, but which were not covered with the aforementioned fibrous composition. In the latter case, in place of the fibrous composition, an ignition layer comprising a mixture of sawdust, charcoal and oxidizer was employed, corresponding to the ignition layer disclosed in the aforementioned application Ser. No. 471,720.

It was found that ignition of both packages with a mixture of gasoline was rapid. After the packages were consumed, it was noted that the fiber cap burned with a low flame for about one-half hour, whereas the package containing briquettes having the aforementioned ignition layer merely glowed and spread very slowly. Temperature measurements made with a thermocouple indicated that after 5, 15, 30 and 60 minutes of combustion of the improved package, containing the aforementioned fibrous composition, there was realized a + $\Delta T°F$. of 20, 40, 50 and 50° over that of a similar package which was not covered with the aforementioned fiber cap, and which was burned under identical conditions. The following Table I illustrates the beneficial effect of the aforementioned fiber cap with respect to the burning rate of the solid fuel package.

TABLE I

Burning Rate[1] - Effect of Waxed Fiber Cap

| | | No Cap | Fiber Cap |
|---|---|---|---|
| Burning Rate, % | | | |
| Example 1 | 1 hr | 31 | 42 |
| do. 2 | 2 hr | 48 | 58 |
| do 3 | 3 hr | 61 | 70 |
| do. 4 | 4 hr | 71 | 79 |
| do. 5 | 5 hr | 78 | — |
| Avg. +ΔT°F.[2] | | 0.25-0.5 | 5 |

[1] 4 lb. package - composition (wt.) - 68% petroleum coke, 12% NaNO₃, 9% wood-sawdust, 5% charcoal, 4% starch and 2% clay (.75% silica - 25% alumina).

[2] Average +ΔT°F. in a peach tree (2 pkgs/tree), 5 ft. above ground, 15 minutes after ignition.

It was also found that where fiberboard is employed as the fibrous material, both density and size affected the wax loading capabilities of the fiber cap and, ultimately, its burning time and effective heat release. The following Table II summarizes the data obtained with respect to such investigations. It was noted that as the board density increases, the quantity of wax required to reach the saturation point diminishes. Thus, as the board density increases from a nominal 16 pounds per cubic foot to about 60 pounds per cubic foot, the free air space between the fibers diminishes rapidly, thus limiting the quantity of wax to be absorbed in the free space. In this regard, the fibrous material acts much like a wicking agent in assisting the wax to burn effectively with little or no smoke, in the manner of a conventional household candle. Thus, as the amount of wax contained in the cap is decreased, the burning time is diminished and less heat output is realized.

smaller fiber cap containing a reduced amount of wax will also satisfactorily perform.

Quite unexpectedly, as a corollary to the above-described improved method of obtaining quick heat release, it was found that the burning fiber cap provided the improvement in reducing smoke output which may be realized with certain types of solid fuel briquettes. In this regard, it was noted that as long as the fiber cap is burning, the smoking tendencies of the solid fuel briquette are considerably reduced. While the solid fuel briquette without the fiber cap may emit a white smoke for a period of about 1 hour after ignition, the same briquette having the fiber cap is found to emit little or no smoke while the cap is burning. After the fiber cap has been consumed, it is found that the white smoke evolution now may last only for about one-half hour or less until the solid fuel briquette, itself, has reached its maximum heat output.

The accompanying drawing shows the results of a field test conducted under actual frost conditions and illustrates the unique protective qualities of the claimed combination of a fuel composition having a primary combustible solid with an ignition temperature greater than about 2,000°F., a secondary combustible solid with an ignition temperature below that of the primary combustible solid and a solid oxidizing agent operated in conjunction with a combustible fibrous composition which, upon ignition, commences to emit heat and continues to do so until the fuel composition begins to emit heat.

The operating parameters, fuel and fibrous cap compositions and data obtained during this test are as set

TABLE II

Interrelationship of Fiber Cap Density, Wax Loading and Burning Time

| Example | Board Type | Cap Dimension (Inches) | Density lbs./ft.³ | Wax Impregnated (Grams) | Burning Time, Minutes |
|---|---|---|---|---|---|
| 1 | Fiberboard | 7½ × 4¼ × 29/64 | 16 | 40 | 14 |
| 2 | | do. | 16 | 80 | 23 |
| 3 | | do. | 16 | 90 | 25 |
| 4 | | do. | 16 | 113 | 30 |
| 5 | | 7½ × 4¼ × 20/64 | 22 | 80 | 17 |
| 6 | | 7½ × 4¼ × 14/64 | 32 | 44 | 13 |
| 7 | | 7½ × 4¼ × 9/64 | 50 | 21 | 10 |
| 8 | Hardboard | 7 × 4 × ⅛ | 60 | 10 | 18 |
| 9 | Paperboard | 7 × 4 × 1/12 | 16 | 21 | 6.5 |
| | | 7 × 4 × ½ | 16 | 42 | 8 |
| | | 7 × 4 × ⅓ | 16 | 59 | 10 |
| 10 | Paperpulp | 6 × 4 × ½ | 16 | 30 | 20 |
| | | 6 × 4 × ½ | 16 | 50 | 24 |

With the foregoing data in mind, it has been found that a minimum of about 30 minutes of burning time is required after the ignition of the aforementioned solid fuel briquette to provide effective heat. Optimum results are therefore obtainable when the burning time of the fibrous cap coincides with the aforementioned 30 minute burning time after ignition of the briquette for providing effective heat, in order to provide a quick release heat until the ignited briquette can assume its independent heating role. Furthermore, it was found that depending upon the type of fibrous material employed in the fiber cap, from about 50 to about 100 grams of wax are required to achieve the aforementioned objects. If less heat is required after ignition, the relatively forth below:

a. A 4 lb. composition consisting of 68 parts by weight of petroleum coke, 12 parts by weight of sodium nitrate, 9 parts by weight of sawdust, 5 parts by weight charcoal, 4 parts by weight starch and 2 parts by weight clay was compared with and without* a fibrous cap having the following dimensions: 7½ × 4¼ × 29/64 inches and consisting of 16 lb/ft³ fiberboards coated with paraffin wax.

* In place of the fibrous cap an ignition composition was employed which comprised a mixture of wood-sawdust, charcoal and oxidizer as disclosed in the aforesaid application Ser. No. 471,720.

b. A peach orchard was employed to test these materials wherein 700 packages per acre of the fuel composition were employed. Temperature readings were taken 15, 30, 45 minutes, 1 hour, 2 hours, 3 hours and 4 hours after ignition.

c. It was ascertained that when using the fuel composition with the fibrous cap, the temperature change measured at the 5 foot level of the trees and represented as Δ T increased 5½°F. 15 minutes after ignition. This curve was maintained with a gradual turndown up through 1¾ hours after ignition.

d. By utilizing the fuel composition omitting the fiberous cap, it was noted that after ½ hour the Δ T was only 1/2°F. This represents a low change in temperature and does not guarantee protection during frost and low temperature conditions.

e. Both of the above materials gave a 2° temperature change 4 hours after ignition.

f. The results show that operating a fuel composition in combination with a wax impregnated cap created the requisite temperature increase over and above that necessary to insure proper protection for vegetation. Thus, the materials operating in combination are much more valuable from a vegetation protection sense than either material working alone.

g. The fibrous cap utilized in this investigation consisted of fiberboard impregnated with paraffin wax.

In summary, the critical atmosphere for low temperature chimney"frost protection is from immediately after ignition to 30 minutes after ignition, since a quick-heat release during this period of time permits the grower to postpone decisions as to the requisite amount of fuel (if any) for a given estimated change in temperature conditions and thereby avoid having to ignite unnecessary fuel in order to supply the desired degree of heat during the critical first one-half hour of burning. It should be apparent that the fibrous cap composition forming a part of this invention is characterized by an initial high temperature (i.e., quick heat release) burning period, and by a ΔT which is comparable to that of the basic fuel composition itself. This initial burning does not operate to the detriment of the remainder of the protection available from the fuel composition, even though the fibrous cap provides for an earlier rise to the greater than 2,000°F. ignition temperature required for the petroleum coke component of the fuel composition; to the contrary, it has been found that by utilizing the fibrous cap of this invention, the fuel composition quickly burns with that degree of heat necessary to supply the requisite protection to vegetation subjected to potential frost and low temperature damage and continues to do so for a period of from 4–5 hours.

The following data and examples will serve to further illustrate the novel combustible *containers* of the present invention and the use thereof in combination with solid fuels (with or without the aforedescribed "igniter pads"), with all the attendant advantages realized in providing a container, which upon combustion leaves a residue of sufficient strength to be self-supporting and for withstanding the weight of the solid fuel without collapsing while undergoing combustion. It will be understood, however, that it is not intended the invention be limited to the particular combustible containers described, nor to the described solid fuels disposed therein or combinations of the aforementioned combustible containers and solid fuels disclosed. Various modifications and adaptions thereof, as previously indicated, may be employed and will be readily apparent to those skilled in the art.

EXAMPLE 11

A box prepared from virgin wood-pulp slurry, having the dimensions 10¼×8½inches ×3 inches and having a weight of 58.5 grams was coated with 10 grams (17%) sodium silicate, (tetra) (waterglass), dried and finally impregnated with 104 grams (150%) of wax. Into this box were placed approximately 3 lbs. of pillow-type briquettes (1⅝×1⅝inches×⅞ inches) for a total weight of 3⅖ lbs. These briquettes were comprised of approximately, by weight, 70% petroleum coke, 9% wood-sawdust, 5% charcoal, 12% sodium nitrate and 4% starch. The fuel package was covered with a gasoline-fuel oil mixture (in equal volume) and ignited. The briquette filled box, after ignition, flamed with an 8 to 12 inch flame for a period of about 20 minutes at which time the briquettes were fully ignited and the box had formed into a hard ash with sufficient strength for adequately confining the burning briquettes. The briquettes continued to burn without spreading any further flame or sparks and at the end of 4 hours, had been practically completely consumed.

EXAMPLE 12

A box prepared from reclaimed newsprint, having the dimensions of 3½×6×2½ inches and having a weight of 31.4 grams, was coated with 2.4 grams (7.6%) sodium silicate (tetra) (waterglass), dried and finally impregnated with 23.4 grams (70%) of wax. This box was filled with approximately 3 lbs. of the pillow-type briquettes, as employed in the foregoing Example 11. As in Example 11, the fuel package was covered with a gasoline-fuel oil mixture (in equal volume) and ignited. The briquette filled box, after ignition, flamed with a small flame for a period of about 13 minutes at which time the briquettes were fully ignited and the box had formed into a hard ash with sufficient strength for adequately confining the burning briquettes. The briquettes continued to burn without spreading any further flame or sparks and at the end of about 4 hours had been practically completely consumed.

Placement of the petroleum coke brick products is dependent upon the plant or crop to be protected. They are usually placed under the arch of the scaffold branches for citrus trees. When deciduous trees are sought to be protected, the products are placed halfway between the drip line and the trunk. For vineyards and row crops they are placed in a row.

In most circumstances, 100 4-lb. packages, consisting of two 2-lb. bricks about an inch apart, of the petroleum coke brick product per acre of citrus trees will produce a 2½° to 3°F. temperature rise for a 5 hour period. Approximately three-fourths of this temperature rise will be obtained at the 10-foot level of the tree.

For the same temperature rise to take place with bare deciduous trees and vineyards in the blooming season, 130 4-lb. packages of the petroleum coke brick product should be used per acre. This temperature rise also has a lifetime of approximately five hours.

Row crops ordinarily require 130 to 150 4-lb. packages per acre to achieve the same heating effect for the same periods of time.

The exact quantity of petroleum coke brick products required per acre varies with the critical temperature and/or the condition of the crop to be protected, the wind velocity, the humidity, the soil surface beneath the trees or in the field, the plot size, topography, and other factors.

The following tables are directed to temperature rise data for calm, clear nights for citrus crops, deciduous crops, and vineyards and row crops when a 4-lb. package of the petroleum coke brick product is utilized.

| Packages per Acre | Size (lb.) | Temperature Rise (Avg.) °F. |
|---|---|---|
| 300 | 4 | 8 – 9½ |
| 100 | 6 | 3½ |
| 200 | 6 | 6½ |

CITRUS CROPS

| Packages/ Acre | Expected Temp. Rise Spacing | Burned in Burned Under Tree | 5' Level in Trees Rows Near Tree |
|---|---|---|---|
| 100 | 20' × 22' or 15' × 29' | 2½ – 3°F. | 2 – 2½°F. |
| 200 | 20' × 11' or 15' × 15' | 5 – 6°F. | 4 –5°F. |
| 300 | 20' × 7' or 15' × 10' | 7½ – 9°F. | 6 – 7½°F. |

DECIDUOUS CROPS

| Packages/ Acre | Spacing | Expected Air Temperature Rise Low Ceiling | High Ceiling |
|---|---|---|---|
| 100 | 20' × 22' or 15' × 29' | 2½ – 3°F. | 2 – 2½°F. |
| 200 | 20' × 11' or 15' × 15' | 5 – 6°F. | 4 – 5°F. |
| 300 | 20' × 7' or 15' × 10' | 7 – 9°F. | 6 – 7½°F. |

VINEYARDS AND ROW CROPS

| Packages/Acre | Spacing | Expected Temperature Rise at Crop Height |
|---|---|---|
| 100 | 20' × 20' or 15' × 29' or 10' × 43' or 5' × 86' | 1½ – 2½°F. |
| 200 | 20' × 11' or 15' × 15' or 10' × 22' or 5' × 43' | 3 – 5°F. |
| 300 | 20' × 7' or 15' × 10' or 5' × 29' | 4½ – 7½°F. |

In order to show the effectiveness of the compositions of the instant invention as protective devices for vegetation, a series of tests was conducted during the period from 1966 to 1969. The effect of the radiant heating bricks was tested on citrus crops, decidous fruit crops, blueberries, grapes, tomatoes and flowers. These tests are set out below.

At the Texas College of Arts and Industries at Weslaco, Tex., 8 acres of 15 foot grapefruit trees planted 100 trees per acre were tested, using the petroleum coke bricks of the instant invention alone or with wind machines or return-stack heaters as supplemental heating devices. The effect of package placement was also investigated.

It was found that a 4 pound package of the fuel composition placed 200 packages per acre gave an average temperature rise of 5°–8° F. Other variations and their results were:

The University of Arizona at Yuma, Ariz. was the location for a test involving 5 acres of orange trees which were planted 100 trees per acre. By using a 4 pound package of the petroleum coke product, it was found that 100 packages per acre gave a 2°F. average temperature rise, 200 packages per acre gave a 3° –4°F. average temperature rise, and 300 packages per acre gave a 4° – 5°F. average temperature rise.

Orange trees in a 5 acre plot, planted 70 trees to an acre, at the University of Florida at Gainesville, Fla., were subjected to a series of tests involving the petroleum coke product of the instant invention. Varying amounts of the 4 pound product were tested as well as return-stack heaters and wax candles. The test results were:

| Product | Units/Acre | Average 5' Level Temp. Rise °F. |
|---|---|---|
| Coke Bricks | 140 | 2½ |
| Coke Bricks | 210 | 4 |
| Return-Stack Heaters | 35 | |
| Wax Candle | 140 | 4 |

In this test for the return-stack heaters, the air temperatures measured 1°F. higher than actual tree temperatures, while the peptroleum coke brick test produced actual tree temperatures 1°F. higher than measured air temperatures.

It was also determined through studies conducted by the Department of Fruit Crops of the University of Florida during the 1966–67 season that compared with return-stack heaters the compositions of this invention, generally speaking, are at least twice as effective in providing protection (as measured by the average temperature response of leaves between 5 and 20 feet). In addition, these studies indicated that 6-lb. packages were preferable to 4-lb. packages in that fewer units and less labor in handling were required and a longer burning period was obtained.

California was the location for a test of 5 acres of grapefruit trees which had been planted 100 trees per acre at the University of California at Riverside. The purpose of the test was to provide supplemental heat for wind machines with 4 pound packages of petroleum coke product. It was found that 100 packages of the product gave a 2° – 5°F. rise in temperature above that obtained with a wind machine alone.

Deciduous fruits were also utilized in testing temperature rise using the petroleum coke bricks of the instant case. More specifically, apples, pears, and peaches were tested.

APPLES

At the Graham Experiment Station of Michigan State University at Grand Rapids, Mich., 4.2 acres of 15 foot apple trees were subjected to testing in order to determine the temperature rise using various amounts of the petroleum coke bricks in the 4 pound package. It was found that 145 packages per acre gave a 2° – 4°F. average temperature rise while 290 packages per acre produced a 3° – 5½°F. average temperature rise.

The effect of heating the trees with the petroleum coke bricks on the final crop yield was as follows:

Yield Differences in Bushels per Acre

| Variety of Apple | Increase Yield (Bushels/Acre) | Stage of Tree Development on Heating Date (6 May 1968) |
|---|---|---|
| Red Delicious | 626 | Advanced Full Bloom |
| McIntosh | 293 | Full Bloom 75% - Late Pink 25% |
| Jonathan | 241 | Pink - Few Open Flowers |

The use of 100 packages per acre of the 4 pound petroleum coke brick product of the instant invention on 15 foot apple trees planted 56 per acre at Rutgers, The State University, New Brunswick, N.J. showed an average 2°F. temperature rise at the 5 foot level and a 1½°F. average temperature rise at the 100 foot level.

At Kearneysville, W. Va., the site of the West Virginia University's agricultural testing station, 180 packages per acre of the 4 pound product used to heat 15 foot apple trees planted 90 per acre produced an average temperature rise of 2° – 3°F. at the 5–8 foot level and an average temperature rise of 1° – 2°F. at the 15 foot level.

There was a temperature rise of 5° – 9°F. within 30 minutes of ignition.

In a colder region, namely, Ithaca, New York, Cornell University undertook a study using the 4 pound petroleum coke brick product of the instant invention on 18 foot apple trees planted 50 per acre. Using 100 packages per acre, an average temperature rise of 2°– 3°F. was noted. By setting 200 packages per acre, the average temperature rise increased to 3° – 5°F.

PEACHES

A test plot of 10 foot peach trees planted 108 per acre at the University of Florida at Quincy, Fla., was used to determine temperature rise obtained with a placement of the 4 pound product of the petroleum coke brick as used in the previous tests with apples.

It was found that one package per tree plus two packages per tree on the borders gave an average temperature rise of 2½° – 3½°F.

The same average temperature rise was found by using the same arrangement of the 4 pound product in a test plot of 2 acres of 12 foot peach trees planted 120 per acre at the University of Colorado, Grand Junction, Colo.

BLUEBERRIES

The North Caroline State University at Castle Hayne, N.C., tested 5 acres of blueberries (mature high bush) with the 4 pound product. The placement of 150 packages per acre gave a temperature rise of 2°F.

A test plot of 3 acres of blueberries (mature high bush) at Rutgers, The State University, New Brunswick, N.J., gave the follow results:

| Packages per Acre (4 lb. product) | Average Temperature Rise, °F. |
|---|---|
| 100 | 1½ – 2 |
| 200 | 3 |

GRAPES

A 4 acre vineyard at the University of California at Davis was tested with the 4 pound product to determine the effect of inversion strength on temperature rise and to compare returnstack heaters with the petroleum coke brick product of the instant invention. The results are set out below.

| Packages Per Acre | Inversion (°F.) | Average Temp. Rise (20 F.) |
|---|---|---|
| 150 | 2 | 3 |
| 150 | 6 | 5 |

| Systems | Units per Acre | Average Temp. Rise (°F.) |
|---|---|---|
| Petroleum Coke Bricks | 150 | 3 – 4 |
| Return-Stack Heaters | 25 – 30 | 3 – 4 |

At Beaulieu Vineyards, Rutherford, Calif., a 25 acre vineyard was used to determine the temperature rise obtained with various amounts of the 4 pound product (1) as border heat and (2) when placed uniformly through the crop area.

It was found that when upwind borders were ignited using approximately 500 packages, a 2°F. temperature rise was obtained over the entire area.

The ignition of 60 packages per acre gave a temperature rise of 2° – 3°F.

TOMATOES

Rutgers, The State University, New Brunswick, N.J., also provided the location for a 5 acre test plot of tomatoes. The purpose of the test was to determine the effect of inversion strength on temperature rise obtained with varying amounts of 4 pound packages of petroleum coke brick. The results were:

| Packages Per Acre | Inversion (°F.) | Average Temp. Rise (°F.) |
|---|---|---|
| 100 | 4 – 6 | 2 – 4½ |
| 100 | 6 – 11 | 2 – 5½ |
| 200 | 1 – 2 | 2 – 4 |

The temperature rise obtained with varying amounts of the 4 pound product was examined at the University of Florida, Homestead, Fla., on a 5 acre tomato plot. With 100 packages per acre, a 1° – 1½°F. average temperature rise was noted, and with 200 packages per acre, the average temperature rise increased to 2° – 5°F.

FLOWERS

A one-half acre plot of gladioli at the University of Florida, Bradenton, Fla., was tested with the 4 pound product to determine the product's ability to protect gladioli during frost.

By using the equivalent of 450 packages per acre (a high amount used due to the small acreage heated), all the flowers were protected. The product kept the temperature 4½°F. above the ambient low of 25°F.

R. J. Claprood of Sun City, Fla., tested a 6 acre plot of chrysanthemums under saran mesh using the 4 pound package of petroleum coke brick and return-stack heaters.

With use of 132 packages per acre in walkways as a supplement to return-stack heaters in the alley bisecting the plot area, a temperature rise of 5°F. was obtained and the flowers were protected.

While preferred embodiments of the novel smokeless and flameless fuel compositions of the present invention, and the method for their preparation, have been described for the purpose of illustration, it will be understood that various modifications and adaptations thereof, which will be obvious to those skilled in the art, may be made without departing from the spirit of the invention.

I claim:

1. A method of protecting trees in orchards and other vegetation including blossoms, fruits, limbs and stems thereof from cold and frost for relatively short critical periods of time usually extending from about three to about five hours between about midnight and dawn, which comprises positioning a series of relatively small closely spaced high intensity radiation combustible units immediately adjacent to said trees and vegetation to be protected from cold and frost, initiating a heating step by igniting an easily ignitable fibrous cap section formed as a part of each unit to thereby produce a rapidly, substantially immediate, emission of radiant heat with an elevation of the temperature in the trees and vegetation, continuing to effect said heating substantially solely thereby for a substantial portion of the said critical period without destructive overheating of the trees and vegetation and affecting ignition of a second combustible section of each of said units by continued burning of the cap section with said second section to produce the combined emission of radiant heat b6 the units and the heating of the trees and vegetation for another portion of the critical period, and thereafter continuing to effect said heating for the major portion of the critical period substantially solely by the burning of the said sections of the units which sections are comprised of two separate bodies formed principally of petroleum coke having an ignition temperature above about 2000°F. with the separate bodies having a vertically arranged burning interface therebetween which produces in the units a substantially flameless glow and emits radiant heat such as to continue the heating of the trees and vegetation at the desired level during said second sections sole heating portion of the said critical period.

2. The method according to claim 1 which comprises combusting a plurality of said combustible heating units in which the second combustible section thereof is a substantially smokeless and flameless fuel composition containing a major proportion of a petroleum coke, characterized upon combustion by a relatively slow rate of burning and the ability to radiate heat without the presence of a substantial flame, having an ignition temperature in excess of about 2000°F., from about 2 to about 20% by weight of a solid oxidizing agent capable of supporting combustion, and about 2 to about 40% by weight of another combustible solid having an ignition temperature below that of said petroleum coke, the aforementioned components being combined in such manner and amounts whereby, upon ignition, said oxidizing agent undergoes decomposition to liberate an oxidizing medium which, upon contact with the secondary combustible solid, produces an exothermic reaction providing, in turn, sufficient heat to effect combustion of said combustible solid.

3. The method according to claim 2 wherein said petroleum coke is present in an amount of about 50–90% by weight.

4. The method according to claim 2 wherein a citrus orchard is being protected.

5. The method according to claim 2 wherein a deciduous orchard is being protected.

6. The method according to claim 4 wherein said combustible heating units are employed in a quantity of about 100 packages per acre.

7. The method according to claim 5 wherein said combustible heating units are employed in a quantity of about 130 packages per acre.

8. The method according to claim 1 wherein a vineyard is being protected.

9. The method according to claim 8 wherein said combustible heating units are employed in a quantity of from about 130 to about 150 packages per acre.

10. The method according to claim 1 wherein said petroleum coke is of a particle size such that at least 95% of said particles will pass through a 100 mesh screen, with essentially all particles passing through an 80 mesh screen.

11. The method according to claim 2 wherein said secondary combustible solid is selected from the group consisting of charcoal and wood-sawdust.

12. The method according to claim 2 wherein said oxidizing agent is selected from the group consisting of nitrates, perchlorates, peroxides and permanganates.

13. The method according to claim 2 wherein said second combustible section of said units comprises adjacent closely associated sections having interfacing surfaces at least slightly spaced and wherein the interface areas between said sections have relatively lower densities than the remaining areas of the sections.

14. The method according to claim 13 wherein said second combustible section of said units comprises blocks placed side by side.

15. The method according to claim 2 wherein said combustible solid is present in an amount from about 65 to about 80% by weight; said another combustible solid is presentis an amount from about 2 to about 20% by weight; and said oxidizing agent is present in amount from about 2 about 15% by weight.

16. The method according to claim 2 wherein said second combustible section of said units comprises by weight, from about 50 to about 90% petroleum coke,
from about 3 to about 20% wood-sawdust, from about 4 to about 20% charcoal,
from about 2 to about 15% sodium nitrate, and
from about 1 to about 10% starch.

17. The method according to claim 2 wherein said second combustible section of said units comprises by weight,
from about 65 to about 80% petroleum coke,
from about 5 to about 15% wood-sawdust,
from about 7 to about 20% charcoal,
from about 4 to about 15% sodium nitrate, and
from about 3 to about 5% starch.

18. The method according to claim 2 wherein said second combustible section of said units comprises by weight,
about 70% petroleum coke,
about 5% charcoal,
about 9% wood-sawdust,
about 12% sodium nitrate, and
about 4% starch.

19. The method according to claim 1 wherein said fibrous cap is impregnated with a paraffin wax.

20. The method according to claim 1 wherein said fibrous cap comprises fiberboard impregnated with a paraffin wax.

21. The method according to claim 1 wherein said combustible cap is in the form of a pad in contact with one side of said solid fuel.

22. The method according to claim 1 wherein said combustible cap is a container for said second combustible section.

23. The method according to claim 22 wherein said container has a coating thereon of a material having sufficient strength to be self-supporting after said container has been essentially combusted so as to withstand collapsing during combustion of said second combustible section, but capable of disintegration through exposure to outdoor weather conditions after said second portion has been combusted.

24. The method according to claim 23 wherein said coating is a composition selected from the group consisting of epoxy resins, acrylic resins, phenolaldehyde resins, urea-aldehyde resins, metal silicates, metal phosphates and metal borates.

25. The method according to claim 24 wherein said composition is sodium silicate.

* * * * *

PO-1050
(5/69)

UNITED STATES PATENT OFFICE
CERTIFICATE OF CORRECTION

Patent No. 3,842,536          Dated October 22, 1974

Inventor(s) JOHN W. SCHICK

It is certified that error appears in the above-identified patent and that said Letters Patent are hereby corrected as shown below:

| Location | Correction |
|---|---|
| Column 2, line 4, | "war" should be --warm--. |
| Column 4, line 52, | "amounts present in" should be --amounts of--. |
| Column 4, line 54, | "in an" should be --under--. |
| Column 4, line 56, | "to about" should be --or--. |
| Column 6, line 21, | "ozidizing" should be --oxidizing--. |
| Column 8, line 43, | "agent in" should be --agent present in--. |
| Column 10, line 61, | "of" first occurrence should be --of--. |
| Column 11, line 7, | "It" should be --In--. |
| Column 11, line 27, | "from" should be --form--. |
| Column 13, line 9, | "in" should be --by--. |
| Column 13, line 25, | "that" should be --than--. |
| Column 15, line 34, | "such" should be --such materials.--. |
| Column 17, Table II, | Example 9, under caption Cap Dimension (Inches) "7 x 4 x 1/2" should be --7 x 4 x 1/4--. |
| Column 17, Table II, | Example 10, under caption Cap Dimension (Inches) BOTH OCCURRENCES, "6 x 4 x 1/2" should be --6 x 4 x 1/4--. |
| Column 19, line 25, | "atmosphere" should be --period--. |
| Column 19, line 26, | "chimney "frost" should be --and frost--. |
| Column 21, Table CITRUS CROPS, | 2nd, 3rd and 4th column headings should be (2nd) --Spacing--. (3rd) --Expected Temp.Rise Burned Under Tree--. (4th) --5' Level in Trees Burned in Rows Near Tree--. |
| Column 21, line 55 | "decidous" should be --deciduous--. |
| Column 22, line 43 | Under heading Product, item Heaters, under caption Average 5' Level Temp. Rise °F. insert --3-1/2--. |
| Column 25, line 48 | "b6" should be --be--. |
| Column 26, line 61 | "presentis an amount" should be --present in an amount--. |

PO-1050
(5/69)

UNITED STATES PATENT OFFICE
CERTIFICATE OF CORRECTION

Patent No. 3,842,536            Dated October 22, 1974

Inventor(s) JOHN W. SCHICK

It is certified that error appears in the above-identified patent and that said Letters Patent are hereby corrected as shown below:

Column 26, line 62,    "present in amount" should be --present in an amount--.
Column 26, line 63,    "2 about" should be --2 to about--.
Column 28, line 15     "portion" should be --section--.

Signed and sealed this 18th day of March 1975.

(SEAL)
Attest:

RUTH C. MASON
Attesting Officer

C. MARSHALL DANN
Commissioner of Patents
. and Trademarks